Figure 4:
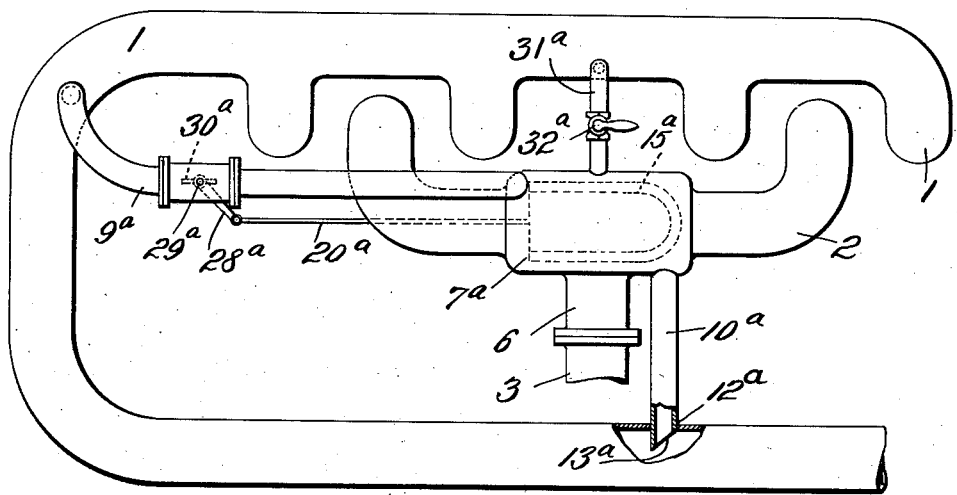

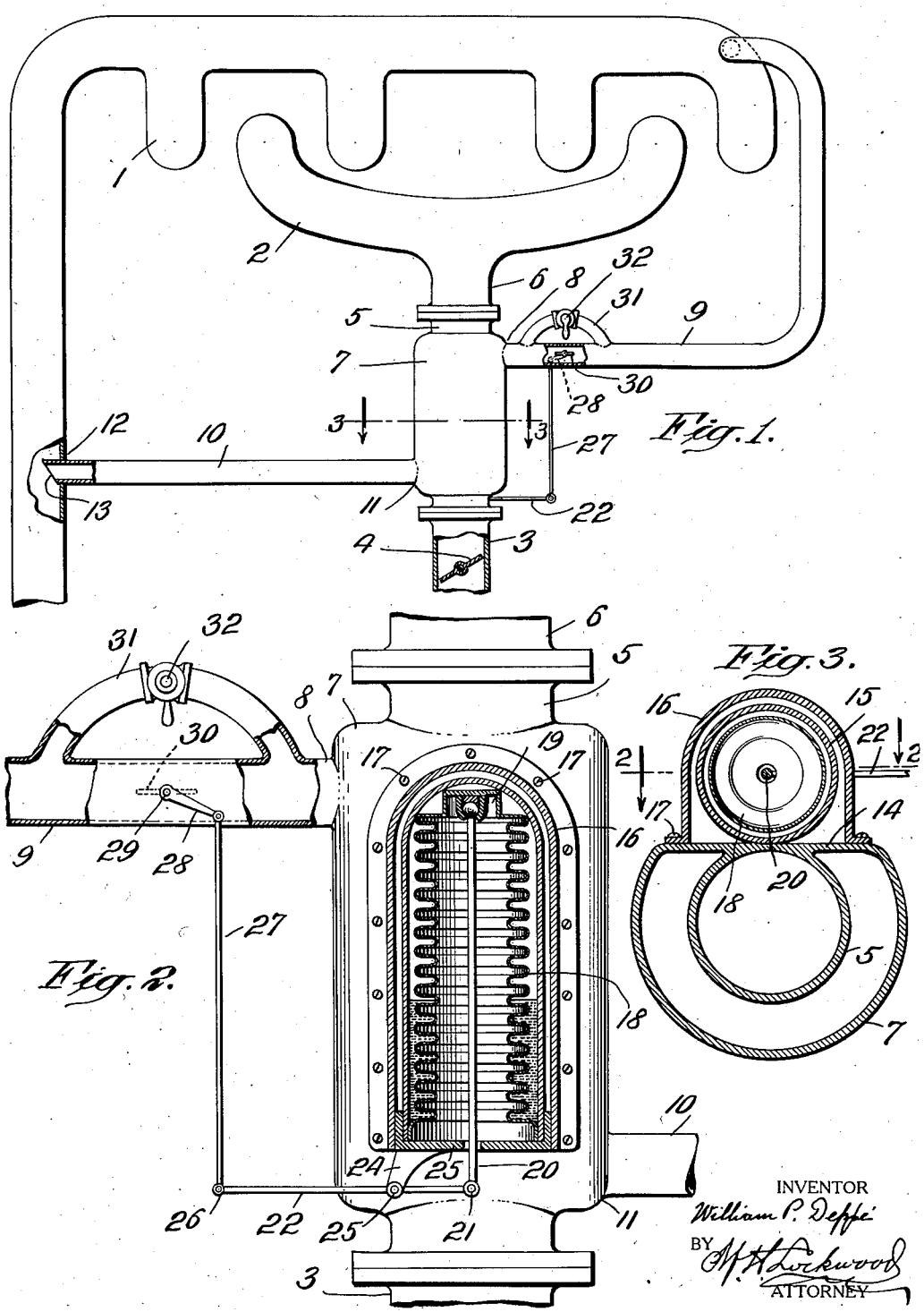

June 23, 1931.  W. P. DEPPÉ  1,811,540
INTERNAL COMBUSTION ENGINE
Filed Oct. 16, 1923   2 Sheets-Sheet 2

INVENTOR
William P. Deppé
BY
ATTORNEY

Patented June 23, 1931

1,811,540

UNITED STATES PATENT OFFICE

WILLIAM P. DEPPÉ, OF BRIGHTWATERS, NEW YORK

INTERNAL COMBUSTION ENGINE

Application filed October 16, 1923. Serial No. 668,842.

My invention relates more particularly to the method of producing, maintaining and supplying an internal combustion engine with a superheated homogeneous dry gaseous mixture by maintaining the temperature of the materials in the walls of the passages for producing and delivering fuel mixtures at a substantially constant temperature above the vaporizing or boiling points of the fuel constituents, as developed and existing in the fuel and air mixtures, and above their condensing points, but below the cracking point producing heavy ends, and below the temperature at which the spheroidal state of the liquid fuels would be produced.

I am aware that various devices and means have been employed for controlling the temperature of the mixture on its way to the engine and thermostatic controls have been employed for regulating the temperature of the air entering the carburetor and that some of such devices are thermostatically controlled by a difference of temperature of the metal parts, but so far as I am aware, no prior attempt has been made to produce and maintain a superheated dry gaseous mixture for use in internal combustion engines, made from liquid fuels and air, by automatically limiting the temperature of the materials of the mixture conduit and maintaining same at a substantially constant temperature below the cracking points of the fuel constituents, and below the spheroidal state of the liquid fuels.

The liquid fuel of commerce as sold to the general public for use in automobiles and internal combustion motors in general, and known as gasoline, is a complex mixture of various constituents, having a range of boiling or end points, from approximately 100° F. as high as 450° F., according to the so-called Engler flask test for liquid fuels or even higher end points when kerosene or fuel oil, for instance, are mixed mechanically with more volatile fuels.

Such motor fuel cannot be utilized to the utmost efficiency without the application of heat to assist in the vaporization of the fuel in the proper ratio with air to give complete combustion. Attempts have been made to supply some of the heat required by chiefly heating the liquid fuel, but this is found unsatisfactory, in that it breaks down the viscosity of the liquid and interferes seriously with the metering thereof. Attempts have also been made to supply the heat by raising the temperature of the air before it picks up the liquid fuel and this, in proper limits is of benefit, except when the heat of the air is relied upon entirely and it is required to raise its temperature to a point in excess of the cracking point or the point at which the spheroidal state of the liquid fuels would be produced, or where metering incorrectly results.

A further object, therefore, of my improved method is to utilize not only means for heating the air, but means for heating the mixture between the carburetor and the intakes of the engine and controlling the temperature of the metal or other materials of the intake manifold or conduit through which the mixture passes to the engine, so that while its temperature is sufficiently high to completely vaporize the liquid fuels, in the required air ratio, and maintain the mixture in a superheated homogeneous dry state, the temperature is not sufficiently high to crack the fuel constituents nor to produce the spheroidal state of the liquid fuel, also to insure the equilibrium conditions necessary for handling complex liquid fuels in air, within proper temperature and heat limits in the stages of vaporization and superheat, etc., as referred to in my issued Patents, #1,335,665, March 30, 1920 and #1,360,098 of November 23, 1920.

A further object is to provide means for heating the walls of predetermined portions of the intake manifold and maintaining them at a substantially constant temperature by providing a thermostat in contact with or adapted to be influenced primarily by the temperature of the materials of the intake conduit walls to control the temperature thereof. Obviously, the means for heating the materials of the intake conduit may be of any well-known construction, including electrical resistance, but preferably, the heat of the exhaust gases is utilized for this purpose. The hot exhaust gases are preferably circulated through a jacket surrounding or forming part of the walls of the intake conduit to be heated and a thermostat is provided for controlling the flow of exhaust gases therethrough, according to the temperature of the intake walls.

The temperature of the exhaust gases in the modern multi-cylinder engine with speeds running from approximately 200 R. P. M. to as high as 4000 R. P. M. may be as low as 450° F. at the idling speed conditions, to as high as 1500° F. at wide open throttle speed conditions.

The temperature in the metals in intake manifolds according to designs and proportions, can be from say 250° F. to as high as 750° F. according to engine speed and throttle openings, and also effected by the cooling means used in any given equipment.

My observations indicate that some motor fuels, as sold to the public by the oil refiners, begin to crack at approximately 350° F., and these same fuels will begin to spheroid badly at say 385° F.

In means to control the temperatures where the fuel mixture may strike the mechanism controlling the flow of heat, one can have liquid fuels through cracking or spheroiding, as well as through incomplete vaporization of all of the liquid fuels in the air mixtures. Hence the necessity for having the mechanism controlling the flow of heat and temperature in the walls of the intake conduits of internal combustion engines out of contact with the fuel mixture.

Figure 5:
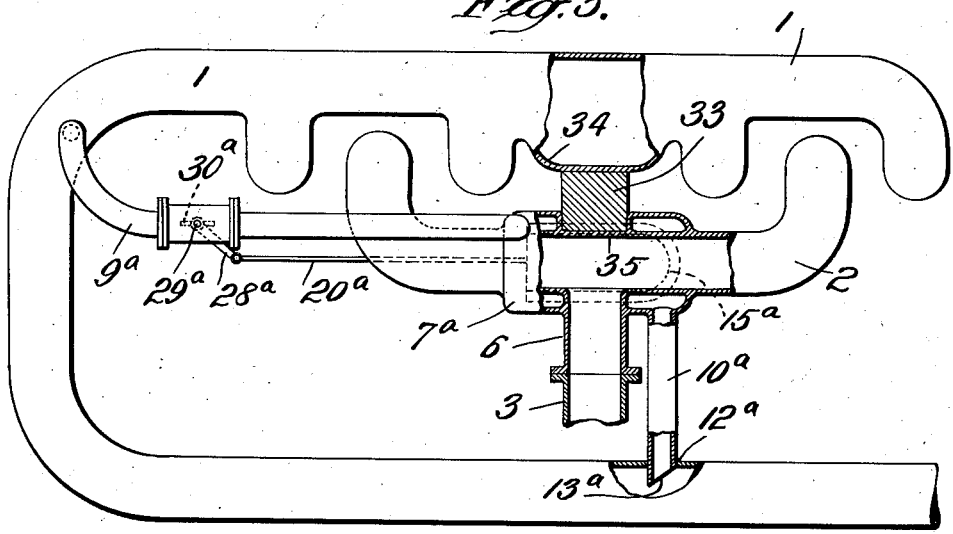

I have illustrated my new method in the accompanying drawings, with various forms of apparatus adapted for carrying out the method, but obviously, any type of apparatus adapted for the purpose may be utilized. Fig. 1 represents the exhaust and intake manifolds in side elevation, with a portion of the riser enclosed by a jacket and adapted to be heated by exhaust gases controlled by a thermostat, according to my improvement; Fig. 2 is a rear view in elevation and partially in section, on the line 2—2 of Fig. 3, of the jacketed portion of the riser, showing the thermostat and its connections; Fig. 3 is a transverse section of the riser and thermostat on the line 3—3 of Fig. 1; Fig. 4 represents a modification, in which the intake manifold is jacketed at the junction between the riser and spreader arms and a by-pass is directly connected between the jacket and the exhaust manifold for providing a constant supply of heat; and Fig. 5 shows substantially the same form of device as shown in Fig. 4, except that the constant supply of heat to the walls of the intake manifold is provided for by a metal block for conducting heat from the exhaust manifold to the walls of the intake manifold, although obviously, any other means to produce a similar result may be utilized.

Referring to the drawings, it will be seen that the exhaust manifold for a four-cylinder engine is represented at 1, and the intake manifold at 2. Any suitable form of carburetor or metering device may be employed, the throttle chamber of which is represented at 3, and contains the usual butterfly throttle valve 4. Between the carburetor 3 and the intake manifold 2, in the form shown in Fig. 1 of the drawings, there is inserted a section 5, forming part of the riser 6 of the intake manifold for conducting the mixture from the carburetor to the intake manifold spreader arms. The riser section 5 is enclosed by a jacket 7, for the greater portion of the circumference, as indicated in Fig. 3 of the drawings. The jacket 7 provides means for heating this portion of the intake manifold conduit by means of exhaust gases or other suitable heated fluid. In the present instance, the upper end of the jacket at 8, is connected by means of a pipe 9 with the exhaust manifold 1, so that exhaust gases from the latter may pass through the jacket. After passing through the jacket 7, the exhaust gases may pass out through a pipe 10, preferably connected at 11 to the lower end of the jacket and entering the exhaust pipe at 12. The end of the pipe 10 is preferably beveled off at 13 to form a baffle opposing the flow of exhaust gases in the exhaust pipe so as to facilitate exhaust from the pipe 10.

It has previously been stated that the object of my improvement is to control the temperature of the walls of the intake conduit, and for this purpose, the rear wall 14 of the jacket may be flattened, and is preferably substantially continuous with the wall of the intake manifold 5, so that a thermostat 15 may be placed in contact with the latter. For the purpose of concentrating the heat and to prevent air currents from affecting the thermostat 15, it is preferably enclosed by a casing 16, which may be secured to the walls 14 of the jacket by suitable screws 17. The thermostat 15, here shown, is of the well known vapor type, but obviously, any suitable thermostat may be employed. In the present instance, the outer shell of the thermostat 15 encloses a collapsible bellows-tube 18, between which and the outer shell 15, the vaporizable liquid is contained. The inner end of the collapsible bellows-tube 18 is closed at 19 and a rod 20 is connected therewith for actuating the heat controlling means. In the arrangement, as shown in Figs. 1 and 2, it will be seen that the outer end of the rod or connecting link 20 is pivoted at 21 to one end of a lever 22, pivoted at 23 to a bracket 24, secured to the bottom wall 25 of the enclosing casing 16. The opposite end of the lever 22 is connected at 26 with a link 27 pivotally connected to a crank arm 28 on the end of a valve rod 29, which carries the usual butterfly type of valve 30, located within the pipe 9, which, as previously pointed out, conducts exhaust gases from the exhaust pipe 1 to the jacket 7. By this arrangement, it will be seen that when the temperature of the metal of the intake conduit in contact with the thermostat reaches a predetermined temperature, the bellows-tube 18 will be collapsed sufficiently to operate the crank arm 28 and close the valve 30 and thereby stop or more or less retard the flow of exhaust gases through the pipe 9 by way of the valve.

It is found in practice, in some cases, that due, in part, to the pulsation in the intake manifold, caused by charging of successive cylinders, and widely varying engine speeds, the demand for heat to vaporize the fuel particles and maintain the superheat condition of the mixture, varies so that at one instant more heat may be required than at another. Therefore, if, at the instant a large amount of heat is required, the valve 30 should be closed, there would be a perceptible drop in the temperature of the metal of the intake manifold and, because of lag in the flow, the temperature of the walls of the intake conduit would not be maintained at a sufficiently constant temperature. In order to avoid this, I have found it preferable to provide for a constant supply of a predetermined amount of heat to the intake manifold, the amount thus supplied being less than the total amount required to maintain the desired temperature of the mixture. By this arrangement the thermostat is only required to regulate the additional heat controlled by the flow of exhaust gases past the valve 30. As shown in Figs. 1 and 2 of the drawings, this constant supply of heat to the jacket 7 or to the walls 5 of the heated portion of the conduit, is supplied by means of a by-pass 31, adapted to conduct the exhaust gases over or around the valve 30 to the jacket 7. A valve 32 is preferably inserted in the by-pass 31, so that the amount of exhaust gases passing through the by-pass may be regulated to supply an amount of heat sufficient to maintain the temperature of the metal of the intake conduit at approximately the temperature required, when the exhaust gases are at their smallest volume and lowest temperature at lowest engine speeds. When more volume of charge is required and when the exhaust gases are at higher temperatures at higher engine speeds, the additional heat will be supplied through the pipe 9 by the opening of the valve 30 and the amount thus admitted will be controlled by the thermostat 15. Obviously, any suitable adjustment may be made that will provide for different proportions of heat to be supplied by the thermostat control, as may be required or desired.

In the form shown in Fig. 4, a jacket 7a, substantially similar to the jacket 7, encloses a portion of the spreader arms of the intake manifold 2, at the junction of the riser 6 therewith and a corresponding pipe 9a provides for conducting exhaust gases from the exhaust manifold 1 to the jacket 7a. A pipe 10a extends from the jacket 7a to the exhaust pipe at 12a and is beveled at 13a similarly to the pipe 10. The rear wall of the intake 2, back of the jacket 7a is provided with a thermostat 15a, the rod 20a of which is connected directly to the crank arm 28a, of the butterfly valve 30a, for regulating the flow of exhaust gases through the pipe 9a to the jacket 7a.

In this form, the exhaust gases for heating the jacket continuously are conducted thereinto through a by-pass pipe 31a, passing directly between the exhaust manifold 1 and the jacket 7a, as shown in Fig. 4. The pipe 31a is similarly provided with a valve 32a for regulating the amount of exhaust gases admitted through the by-pass. The operation of the form shown in Fig. 4 is substantially identical with the operation of the form in Fig. 1, except that the portion of the intake manifold, which is heated and maintained at a substantially constant temperature by means of the thermostat control, is different.

The form shown in Fig. 5 is the same as that shown in Fig. 4, so far as the arrangement of the parts is concerned, and the same portion of the intake manifold is heated; the only difference being that instead of using a by-pass pipe connection between the exhaust pipe and the jacket to provide for a constant heat supply to the walls of the intake manifold, a metal block 33 is provided, for conducting heat directly from the wall 34 of the exhaust manifold 1 to the wall at 35 of the intake manifold 2, as clearly shown in Fig. 5. The other parts of the form shown in Fig. 5 are given the same reference numerals as the corresponding parts in Fig. 4, and no further description thereof is necessary.

It is believed that the operation of the apparatus described for carrying out my improved method will be fully understood from the description given, but it is well to bear in mind that this method and apparatus are designed and adjusted to produce, maintain, and deliver to the engine a superheated homogeneous mixture of fuels and air in proper ratio for complete combustion, the mixture when so prepared and delivered having the properties of a dry gas able to remain as such during delivery, and in the intake and compression strokes of engine, and capable of swift and complete combustion, such as is fully described and claimed in my Patent, No. 1,335,665 of March 30, 1920, for internal combustion engines.

My improvement, however, should not be confused with various prior manifold and mixture heating devices, which heat the metal walls of the intake conduit irregularly, or to temperatures above the cracking point or above the point at which the spheroidal state of the liquid fuels will be produced, or which prevent the desired equilibrium conditions in stage heating processes. In contradistinction, the importance of my improvement will be apparent, in that means are provided for maintaining the walls of the intake conduit at a sufficiently high temperature to insure complete vaporization, but not above the cracking points or the spheroidal state for the liquid fuels, or make impossible equilibrium conditions in vapors of liquid fuels in air mixtures. This is, in the present instance, controlled by the thermostat which regulates the flow of auxiliary heat to the heated portion of the intake manifold to supplement the continuous heat supplied through the by-pass 31—31a or by other suitable means, such as the conducting block 33.

While I have shown several forms of apparatus for carrying out my improved method of heat control of the materials of the conduit while providing a superheated homogeneous dry gaseous mixture for delivery to the engine, it will be understood that I am not limited to the forms shown, for obviously, various modifications in the details of construction may be made and the arrangement modified by the omission or addition of parts, without departing from the spirit and scope of the invention.

Furthermore, in some fuel mixtures of hybrid types, and for engines of various size and speed, it may be desirable to use several points of the thermostat control to insure complete vaporization, superheat and homogeneity, and these may follow the principles described herein, and it may be further understood that, where desired and commercially practical, a sufficient amount of material may be incorporated in the walls of the section of the manifold being heated, to act as a reservoir of heat in place of the means herein described, and in addition to the thermostat control.

I claim:—

1. In the operation of an internal combustion engine, the method of producing a superheated dry gaseous mixture and operating the engine thereon, which comprises forming a mixture of air and liquid fuels in predetermined ratio, then passing said mixture to the engine while simultaneously subjecting it to heat at a preselected substantially constant temperature, which is above the vaporizing or boiling points of the fuel constituents in the air ratio employed and below the temperature of cracking and of the spherical state of the liquid fuels, said constant temperature being maintained by heat from a substantially continuous source in conjunction with heat from a source subject to control for maintaining the preselected constant temperature, the arrangement and control of the heat being such that a superheated homogeneous dry gaseous mixture is produced, maintained and delivered to the combustion chambers of the engine.

2. In the operation of an internal combustion engine, the method of producing a superheated dry gaseous mixture and operating the engine thereon, which comprises passing a mixture of air and liquid fuels, in proper ratio, to the engine while subjecting said mixture to heat at a preselected substantially constant temperature and maintaining said substantially constant temperature by the conjoint application of heat from a continuous source and from a source adapted to be controlled according to the amount of heat required to maintain said preselected constant temperature, the heat treatment thus applied being such as to produce, maintain and deliver to the engine a dry mixture which is above the vaporizing temperature of the fuel constituents in the air ratio employed and below the temperature of cracking and of the spheroidal state of the liquid fuel.

3. In the operation of an internal combustion engine, the method of producing a superheated dry gaseous mixture and operating the engine thereon, which comprises passing a mixture of air and liquid fuels, in proper ratio, to the engine while subjecting said mixture to heat at a preselected substantially constant temperature, and maintaining the preselected constant temperature by heat applied from a continuous source, operating conjointly with heat from a source controlled according to the additional amount required to maintain the preselected constant temperature, the heat treatment from the two sources being such as to produce, maintain and deliver to the engine a gaseous fuel mixture at a temperature above the boiling or vaporizing point of the fuels in the fuel to air ratio employed and below the cracking or spheroidal temperature of the fuels.

4. In the operation of an internal combustion engine, the method of producing a superheated dry gaseous mixture and operating the engine thereon, which comprises passing a mixture of air and liquid fuels, in proper ratio, to the engine while subjecting said mixture to heat at a preselected substantially constant temperature, said heat being derived from a continuous source and supplemented by additional heat operating conjointly therewith and controlled to maintain the preselected constant temperature, said additional heat being applied independently of said continuous heat, the arrangement being such that the heat thus conjointly applied is adapted to subject the fuel mixture to and maintain it at a substantially constant temperature above the vaporizing temperature of the fuel constituents in the air ratio employed and below a temperature capable of producing and maintaining the spheroidal state of the liquid fuels, the amount of controlled additional heat being regulated according to the preselected temperature to be maintained.

5. In the operation of an internal combustion engine, the method of producing a superheated dry gaseous mixture and operating the engine thereon, which comprises passing a mixture of air and liquid fuels, in proper ratio, to the engine, while subjecting the mixture to a continuous source of heat, and supplementing the latter with controlled auxiliary heat adapted to be regulated to produce a preselected substantially constant temperature so as to subject the mixture to and maintain it at a substantially constant temperature so as to produce a gaseous mixture having a temperature above the vaporizing temperature of the fuel constituents in the air ratio employed and below the cracking or spheroidal temperature of the fuel constituents.

6. In an internal combustion engine, the combination with the intake manifold, of means for continuously heating a portion thereof, to supply part of the heat required for vaporizing the fuel, means operating in conjunction with said continuous heating means for supplying additional heat to the intake manifold, and a thermostat for controlling said additional heat according to the temperature of the heated portion so as to maintain the same at a preselected substantially constant temperature above the vaporizing temperature of the liquid fuels, in the fuel to air ratio employed, and below the cracking temperature of the fuel constituents, the temperature so maintained being insufficient to produce the spheroidal state of the liquid fuels.

7. In an internal combustion engine, the combination with intake and exhaust manifolds, of means for continuously heating predetermined portions of the intake manifold from heat of the exhaust to maintain a preselected temperature, means for applying auxiliary heat to said heated portions of the intake manifold and a thermostat controlling said auxiliary heating means for controlling the heat according to the temperature of and in a manner to maintain said heated portions at a preselected substantially constant temperature, which is above the vaporizing point of the fuel, in the fuel to air ratio employed, and such that equilibrium vaporization conditions in the air and fuel mixture may exist.

8. In an internal combustion engine, the combination with intake and exhaust manifolds, of a jacket for heating predetermined portions of the intake manifold, connections between the exhaust manifold and said jacket for utilizing exhaust gases for continuously heating said intake manifold to maintain a preselected temperature, means operating in conjunction with the continuous heating of said manifold for applying additional heat to the intake manifold and a thermostat mounted in position to be controlled by the temperature of the walls of said jacket heated portion for varying the flow of exhaust gases through said jacket, the conjoint action of said heating means being adapted to maintain the walls of said intake manifold at a preselected constant temperature, such as will produce, maintain and deliver to the engine a fuel and air mixture above the vaporizing temperature of the liquid fuel, in the fuel to air ratio employed, and below the temperature of cracking and of the spheroidal state of the liquid fuel.

9. In an internal combustion engine, the combination with intake and exhaust manifolds, of a jacket for heating a portion of the intake manifold, connections between the exhaust manifold and said jacket for utilizing exhaust gases as the source of heat in said jacket, said connections including means for utilizing said exhaust gases as a continuous source of heat and also as an auxiliary source of heat, a valve for controlling the flow of said auxiliary portion of the exhaust gases into the jacket, a thermostat operatively connected with said valve and means for mounting said thermostat in contact with the heated portion of the intake manifold, so that said valve is adapted to be operated according to the temperature of said heated portion, said thermostat being adjusted to maintain the temperature of said heated portion substantially constant and at a preselected temperature such as will produce, maintain and deliver to the engine a dry mixture above the vaporizing temperature of the liquid fuel and below the temperature of cracking and of the spheroidal state thereof.

10. In an internal combustion engine, the combination with intake and exhaust manifolds, of a jacket for heating a portion of said intake manifold, pipe connections between said jacket and the exhaust manifold for conducting exhaust gases through said jacket, a valve in said pipe for regulating the flow of exhaust gases to the jacket, a thermostat connected with said valve and mounted in contact with and adapted to be influenced by the temperature of that portion of the intake manifold heated by said jacket, the arrangement being adapted for maintaining the heated portion of the intake manifold at a preselected substantially constant temperature above the vaporizing point of the fuel, but below the temperature of cracking or of the spheroidal state for the fuel, and means providing a continuous supply of heat to said intake manifold independently of but operating conjointly with the heat supplied thereto under control of said thermostat, comprising connections for delivering exhaust gases to said jacket independently of that supplied through said thermostat controlled valve.

WILLIAM P. DEPPÉ.